(12) United States Patent
Zhu

(10) Patent No.: US 12,221,151 B2
(45) Date of Patent: Feb. 11, 2025

(54) SEAT AND STROLLER

(71) Applicant: Wonderland Switzerland AG, Steinhausen (CH)

(72) Inventor: Wanquan Zhu, Steinhausen (CH)

(73) Assignee: WONDERLAND SWITZERLAND AG, Steinhausen (CH)

(*) Notice: Subject to any disclaimer, the term of this patent is extended or adjusted under 35 U.S.C. 154(b) by 268 days.

(21) Appl. No.: 17/840,631

(22) Filed: Jun. 15, 2022

(65) Prior Publication Data
US 2022/0402539 A1 Dec. 22, 2022

(30) Foreign Application Priority Data
Jun. 16, 2021 (CN) .......................... 202110664141.3

(51) Int. Cl.
*B62B 9/12* (2006.01)
*B62B 7/06* (2006.01)

(52) U.S. Cl.
CPC . *B62B 9/12* (2013.01); *B62B 7/06* (2013.01)

(58) Field of Classification Search
CPC .. B62B 9/12; B62B 9/10; B62B 9/102; B62B 7/06; B62B 7/068
See application file for complete search history.

(56) References Cited

U.S. PATENT DOCUMENTS

| | | | |
|---|---|---|---|
| 7,364,183 B2 * | 4/2008 | Lee | B62B 7/142 280/47.38 |
| 9,962,011 B1 * | 5/2018 | Eyman | B62B 9/12 |
| 2011/0175330 A1 | 7/2011 | Smith | |
| 2020/0010107 A1 | 1/2020 | Lin | |
| 2022/0153330 A1 * | 5/2022 | Wu | B62B 7/08 |

FOREIGN PATENT DOCUMENTS

| | | |
|---|---|---|
| CN | 1772546 A | 5/2006 |
| CN | 201914298 U | 8/2011 |
| CN | 203739939 U | 7/2014 |
| CN | 209650357 U | 11/2019 |

(Continued)

OTHER PUBLICATIONS

First Office Action issued in Chinese Patent Application No. 2021106641413, dated Aug. 28, 2024, 23 pages.

*Primary Examiner* — John D Walters
(74) *Attorney, Agent, or Firm* — HAUPTMAN HAM, LLP

(57) ABSTRACT

A seat includes a seat plate, a first backrest support member, a second backrest support member, a third backrest support member, a first sliding sleeve and a second sliding sleeve. The second backrest support member is telescopically connected to the first backrest support member. The third backrest support member is telescopically connected to the second backrest support member and pivotally connected to the seat plate. The first sliding sleeve is disposed on the first backrest support member. The second sliding sleeve is disposed on the second backrest support member. The first backrest support member, the second backrest support member and the third backrest support member are able to slide with respect to each other to be folded or unfolded. The first sliding sleeve slides as the first backrest support member slides, and the second sliding sleeve slides as the second backrest support member slides.

18 Claims, 12 Drawing Sheets

(56) References Cited

FOREIGN PATENT DOCUMENTS

| | | | | |
|---|---|---|---|---|
| CN | 110525504 | A | 12/2019 | |
| CN | 210364008 | U | 4/2020 | |
| CN | 111591338 | A | 8/2020 | |
| CN | 211289994 | U | 1/2021 | |
| CN | 112407016 | A | 2/2021 | |
| CN | 212529785 | U | 2/2021 | |
| CN | 213008318 | U | 4/2021 | |
| DE | 102021128318 | A1 * | 5/2022 | ........... B62B 5/0013 |
| TW | M584760 | U | 10/2019 | |

* cited by examiner

SEAT AND STROLLER

BACKGROUND OF THE INVENTION

1. Field of the Invention

The invention relates to a seat and a stroller and, more particularly, to a seat capable of effectively reducing an overall height after being folded and a stroller equipped with the seat.

2. Description of the Prior Art

A stroller is a tool used by parents to carry babies or children when they go shopping. In general, a seat of a conventional stroller is detachable and foldable to facilitate storage or transportation. However, an overall height of the seat cannot be effectively reduced by the aforesaid manner.

SUMMARY OF THE INVENTION

The invention provides a seat capable of effectively reducing an overall height after being folded and a stroller equipped with the seat, so as to solve the aforesaid problems.

According to an embodiment of the invention, a seat comprises a seat plate, a first backrest support member, a second backrest support member, a third backrest support member, a first sliding sleeve and a second sliding sleeve. The second backrest support member is telescopically connected to the first backrest support member. The third backrest support member is telescopically connected to the second backrest support member and pivotally connected to the seat plate. The first sliding sleeve is disposed on the first backrest support member. The second sliding sleeve is disposed on the second backrest support member. The first backrest support member, the second backrest support member and the third backrest support member are able to slide with respect to each other to be folded or unfolded. The first sliding sleeve slides as the first backrest support member slides, and the second sliding sleeve slides as the second backrest support member slides.

According to another embodiment of the invention, a stroller comprises a frame and the aforesaid seat. The seat is detachably disposed on the frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
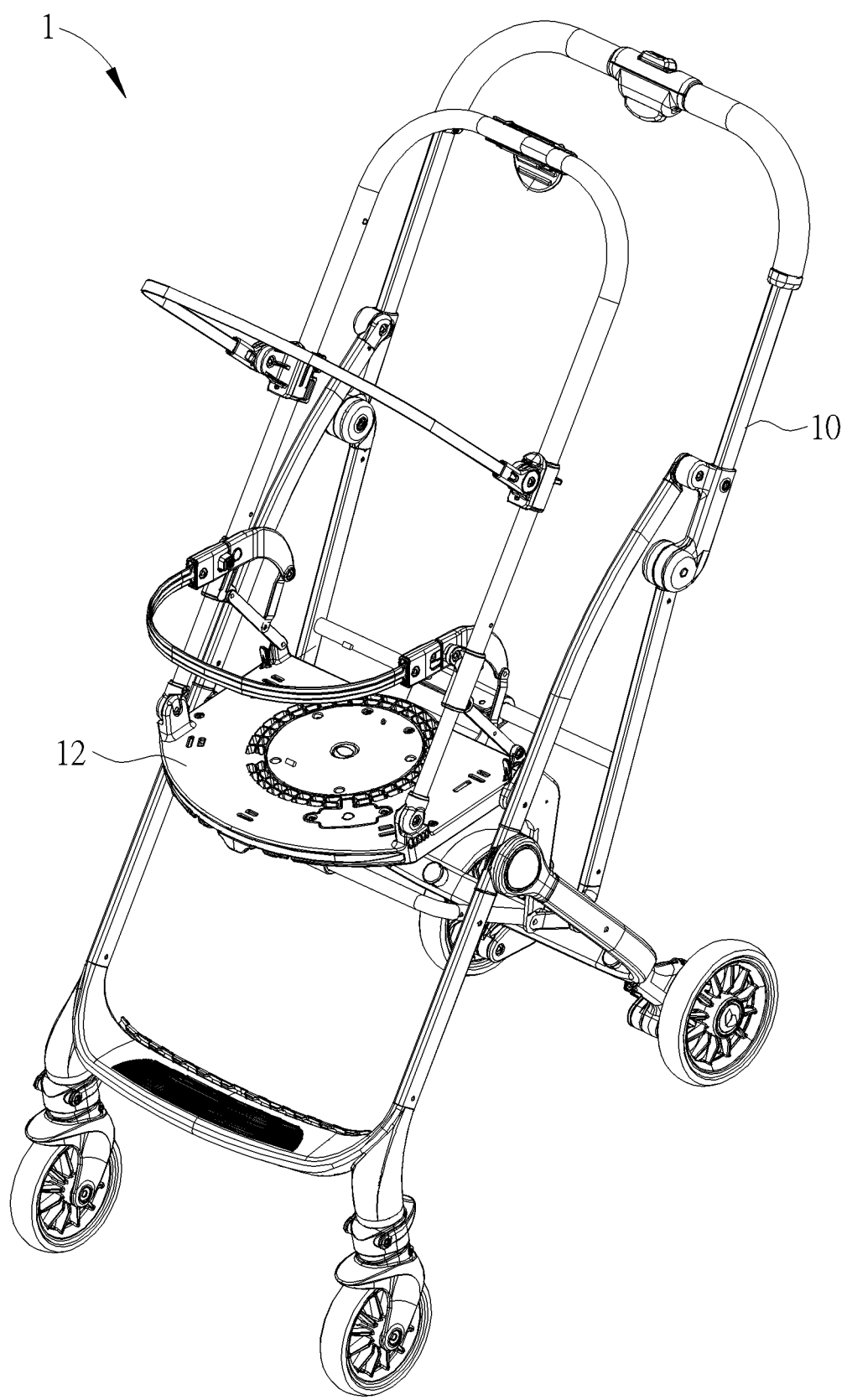
FIG. 1 is a perspective view illustrating a stroller according to an embodiment of the invention.
Figure 2:
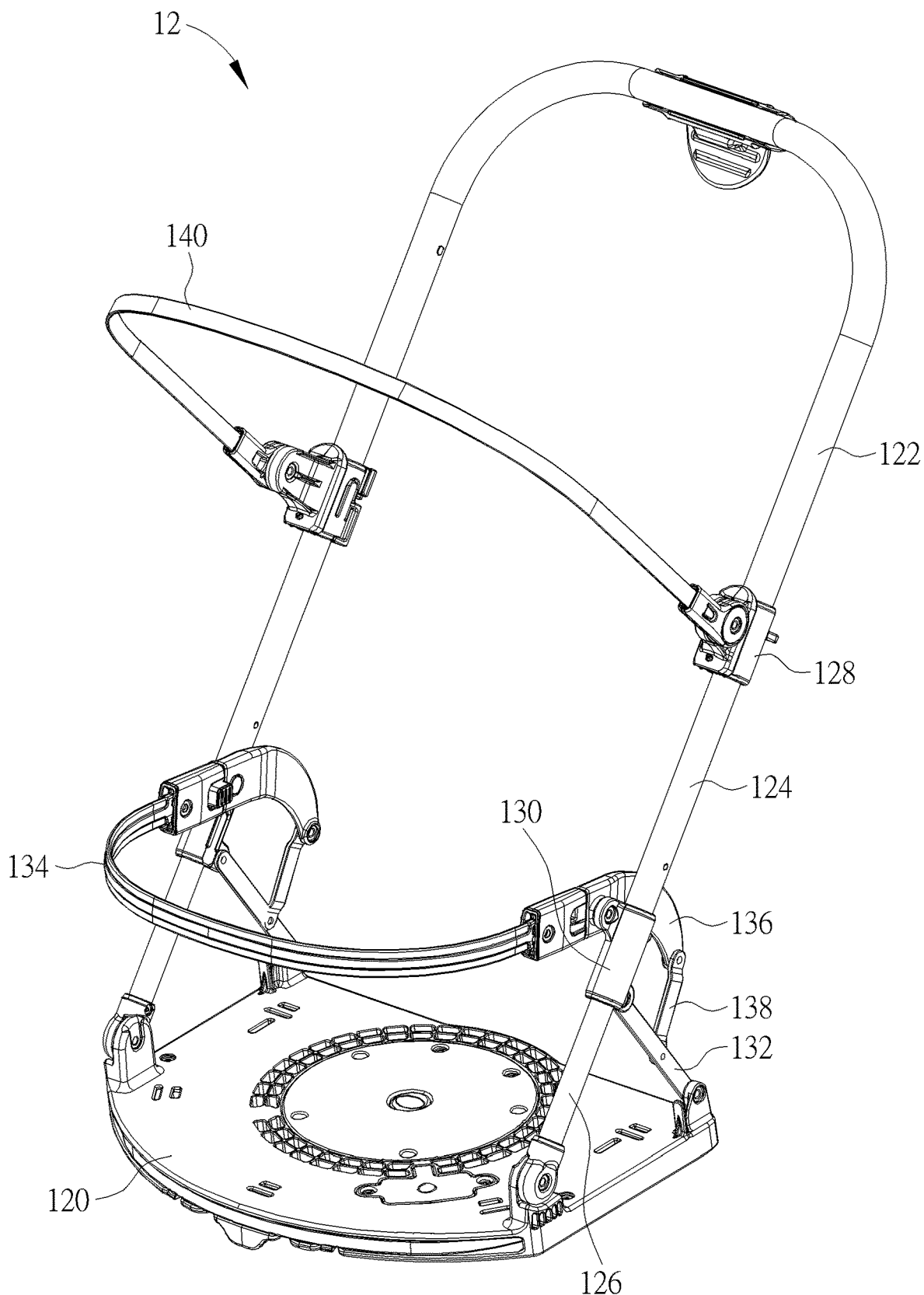
FIG. 2 is a perspective view illustrating a seat shown in FIG. 1.
Figure 3:
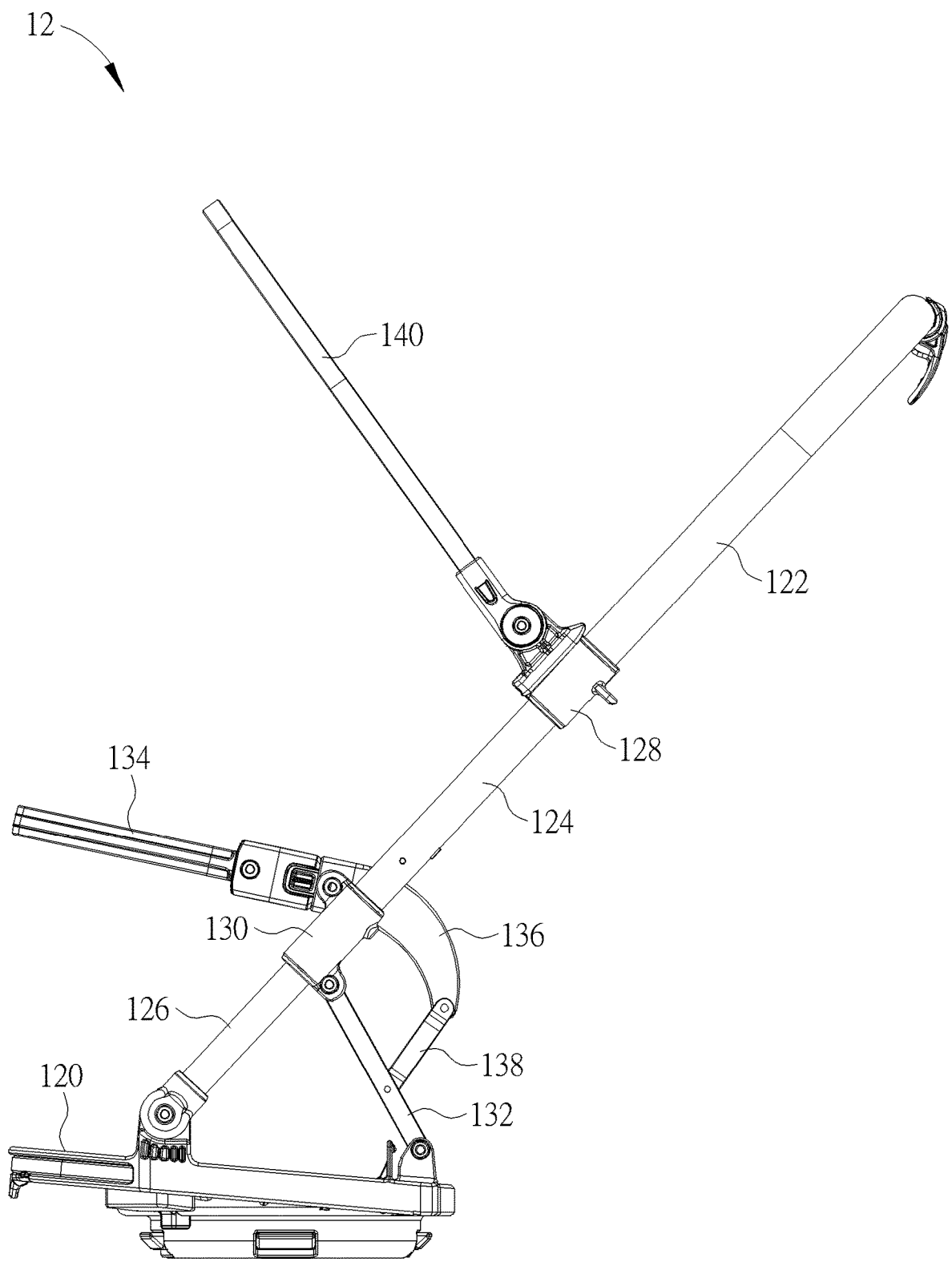
FIG. 3 is a side view illustrating the seat shown in FIG. 2.
Figure 4:
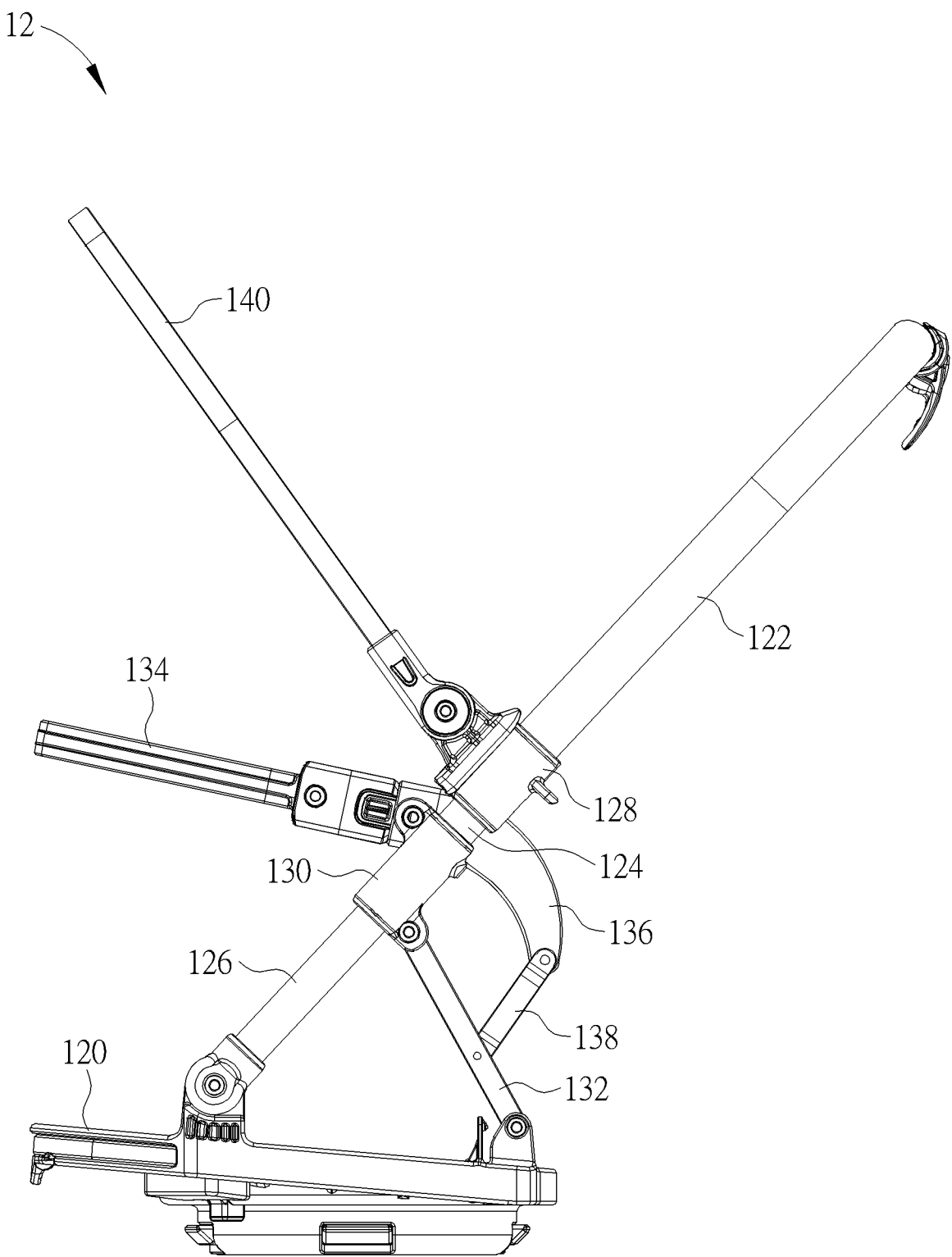
FIG. 4 is a side view illustrating a first backrest support member shown in FIG. 3 sliding downward.
Figure 5:
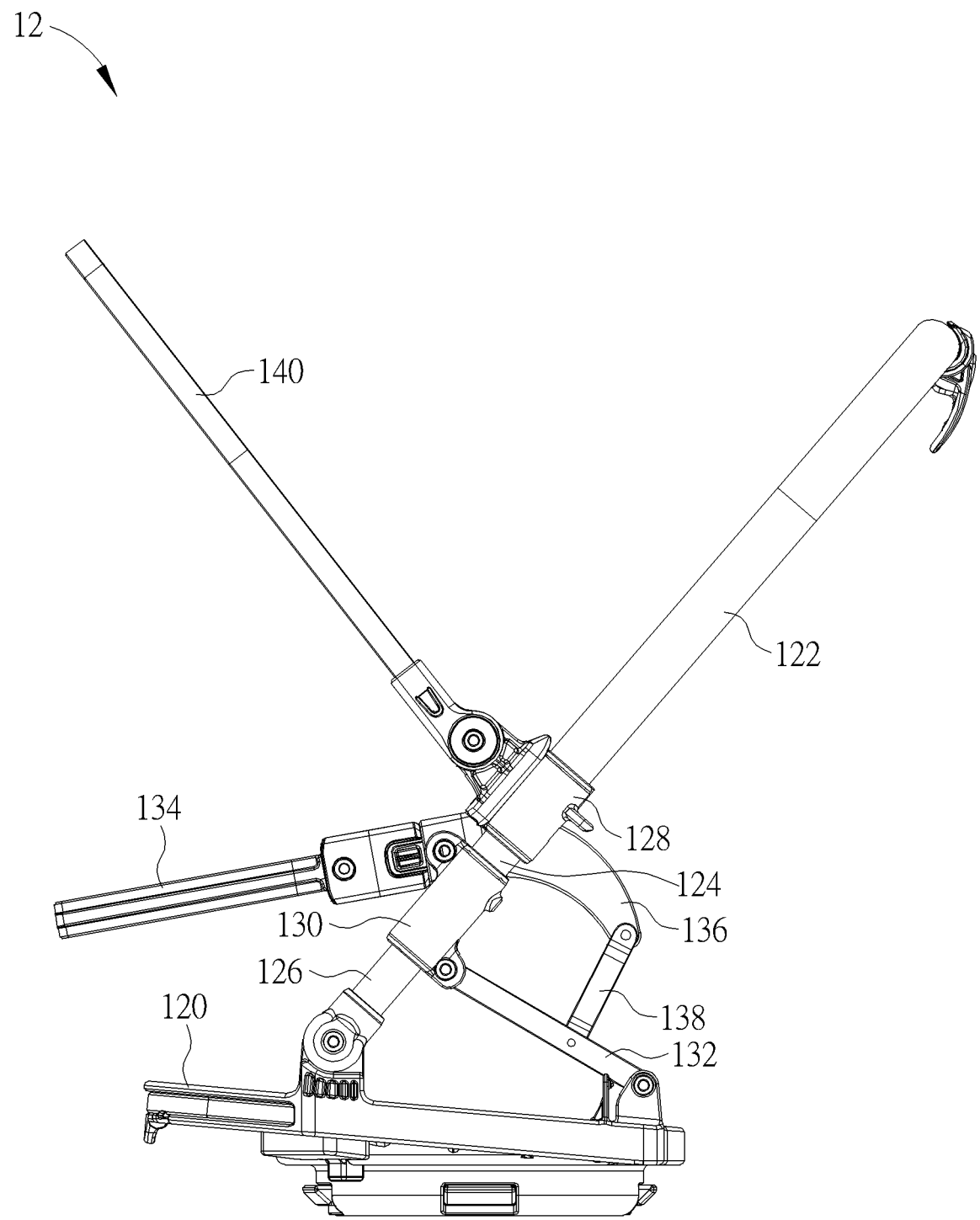
FIG. 5 is a side view illustrating a second backrest support member shown in FIG. 4 sliding downward.
Figure 6:
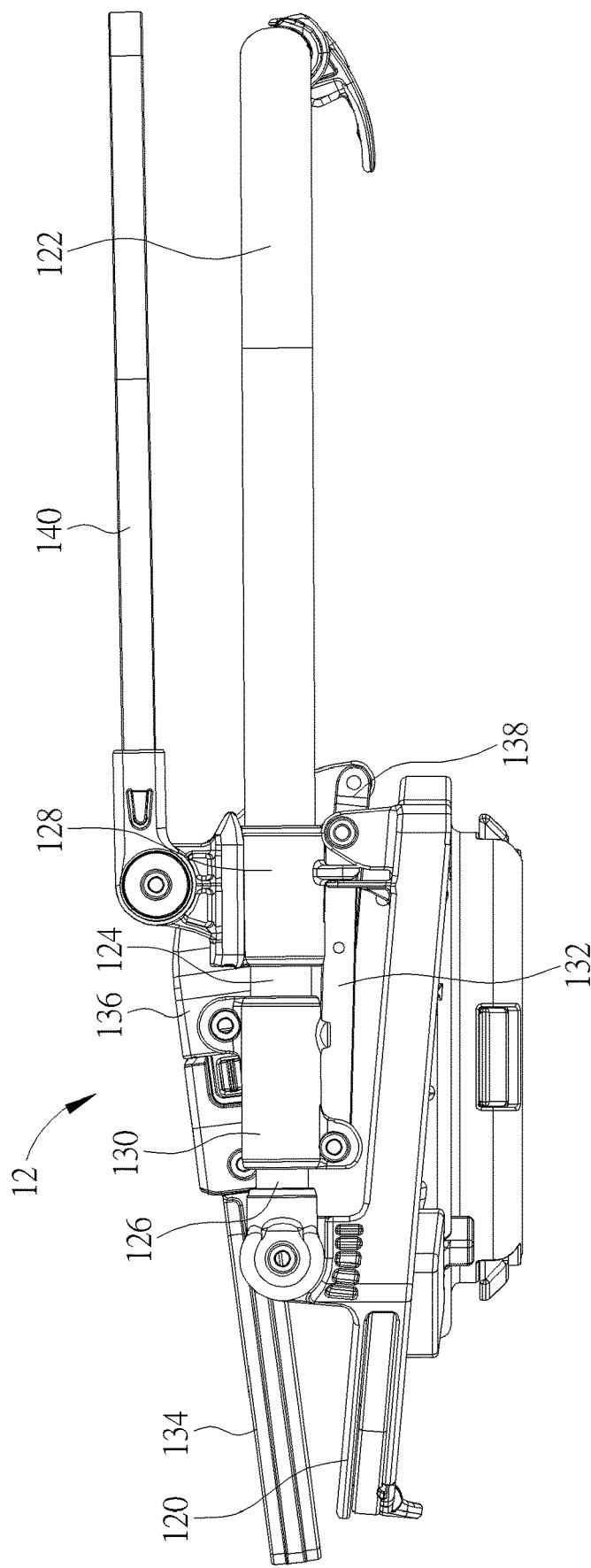
FIG. 6 is a side view illustrating the seat shown in FIG. 5 being folded.

Referring to FIG(S). 1 to 6, FIG. 1 is a perspective view illustrating a stroller 1 according to an embodiment of the invention, FIG. 2 is a perspective view illustrating a seat 12 shown in FIG. 1, FIG. 3 is a side view illustrating the seat 12 shown in FIG. 2, FIG. 4 is a side view illustrating a first backrest support member 122 shown in FIG. 3 sliding downward, FIG. 5 is a side view illustrating a second backrest support member 124 shown in FIG. 4 sliding downward, and FIG. 6 is a side view illustrating the seat 12 shown in FIG. 5 being folded.

As shown in FIG. 1, the stroller 1 comprises a frame 10 and a seat 12, wherein the seat 12 is detachably disposed on the frame 10. As shown in FIGS. 2 to 6, the seat 12 comprises a seat plate 120, a first backrest support member 122, a second backrest support member 124, a third backrest support member 126, a first sliding sleeve 128, a second sliding sleeve 130, a backrest linkage arm 132, a handrail 134, a handrail fixing base 136, a handrail linkage arm 138 and a canopy 140. It should be noted that the structure of the stroller 1 of the invention is substantially symmetrical, so some components described in the invention are arranged on both sides of the stroller 1.

As shown in FIG(S). 2 to 6, the second backrest support member 124 is telescopically connected to the first backrest support member 122, and the third backrest support member 126 is telescopically connected to the second backrest support member 124 and pivotally connected to the seat plate 120. Thus, the first backrest support member 122, the second backrest support member 124 and the third backrest support member 126 are able to slide with respect to each other to be folded or unfolded, and the third backrest support member 126 is able to rotate with respect to the seat plate 120 to be folded or unfolded. The first sliding sleeve 128 is disposed on the first backrest support member 122 and the second sliding sleeve 130 is disposed on the second backrest support member 124. Thus, the first sliding sleeve 128 slides as the first backrest support member 122 slides, and the second sliding sleeve 130 slides as the second backrest support member 124 slides.

As shown in FIG(S). 2 to 6, the backrest linkage arm 132 is pivotally connected to the seat plate 120 and the second sliding sleeve 130. Thus, when the second backrest support member 124 slides with respect to the third backrest support member 126, the second sliding sleeve 130 drives the backrest linkage arm 132 to rotate, so as to drive the third backrest support member 126 to rotate with respect to the seat plate 120. Furthermore, the handrail 134 is detachably connected to the handrail fixing base 136, the handrail fixing base 136 is pivotally connected to the second sliding sleeve 130, and the handrail linkage arm 138 is pivotally connected to the handrail fixing base 136 and the backrest linkage arm 132. Thus, when the second sliding sleeve 130 drives the backrest linkage arm 132 to rotate, the backrest linkage arm 132 further drives the handrail linkage arm 138 to rotate, so as to drive the handrail fixing base 136 and the handrail 134 thereon to rotate. Moreover, the canopy 140 is pivotally connected to the first sliding sleeve 128. Thus, the canopy 140 slides as the first sliding sleeve 128 slides and the canopy 140 is able to rotate with respect to the first backrest support member 122.

As shown in FIG(S). 3 to 6, when the first backrest support member 122, the second backrest support member 124 and the third backrest support member 126 slide with respect to each other to be folded or unfolded, the second sliding sleeve 130 drives the third backrest support member 126 to be folded or unfolded with respect to the seat plate 120 through the backrest linkage arm 132, such that the whole seat 12 is folded or unfolded. At the same time, the second sliding sleeve 130 further drives the handrail 134 to be folded or unfolded synchronously through the backrest linkage arm 132 and the handrail linkage arm 138. Moreover, the canopy 140 also slides as the first sliding sleeve 128 slides and a user may rotate the canopy 140 to fold or unfold the canopy 140. Accordingly, the user can fold or unfold the seat 12 conveniently and rapidly. The invention achieves three-stage folding by the telescopic arrangement of the first backrest support member 122, the second backrest support member 124 and the third backrest support member 126. Accordingly, an overall height of the seat 12 can be effectively reduced after the seat 12 is folded, as shown in FIG. 6.

Figure 7:
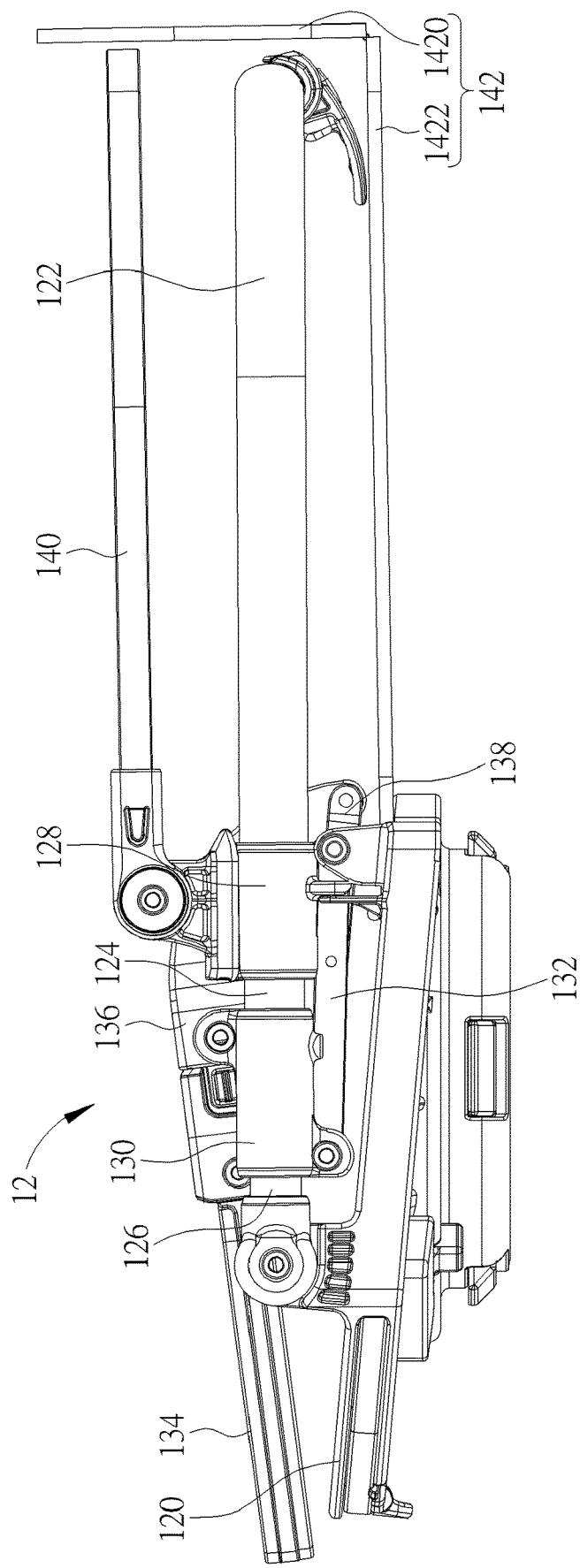
FIG. 7 is a side view illustrating the seat 12 shown in FIG. 6 equipped with a backrest plate structure.

Referring to FIG. 7, FIG. 7 is a side view illustrating the seat 12 shown in FIG. 6 equipped with a backrest plate structure 142. As shown in FIG. 7, the seat 12 may further comprise a backrest plate structure 142, wherein the backrest plate structure 142 may comprise a first plate body 1420 and a second plate body 1422 pivotally connected to each other. In practical applications, the backrest plate structure 142 is configured to be covered by a fabric.

Figure 8:
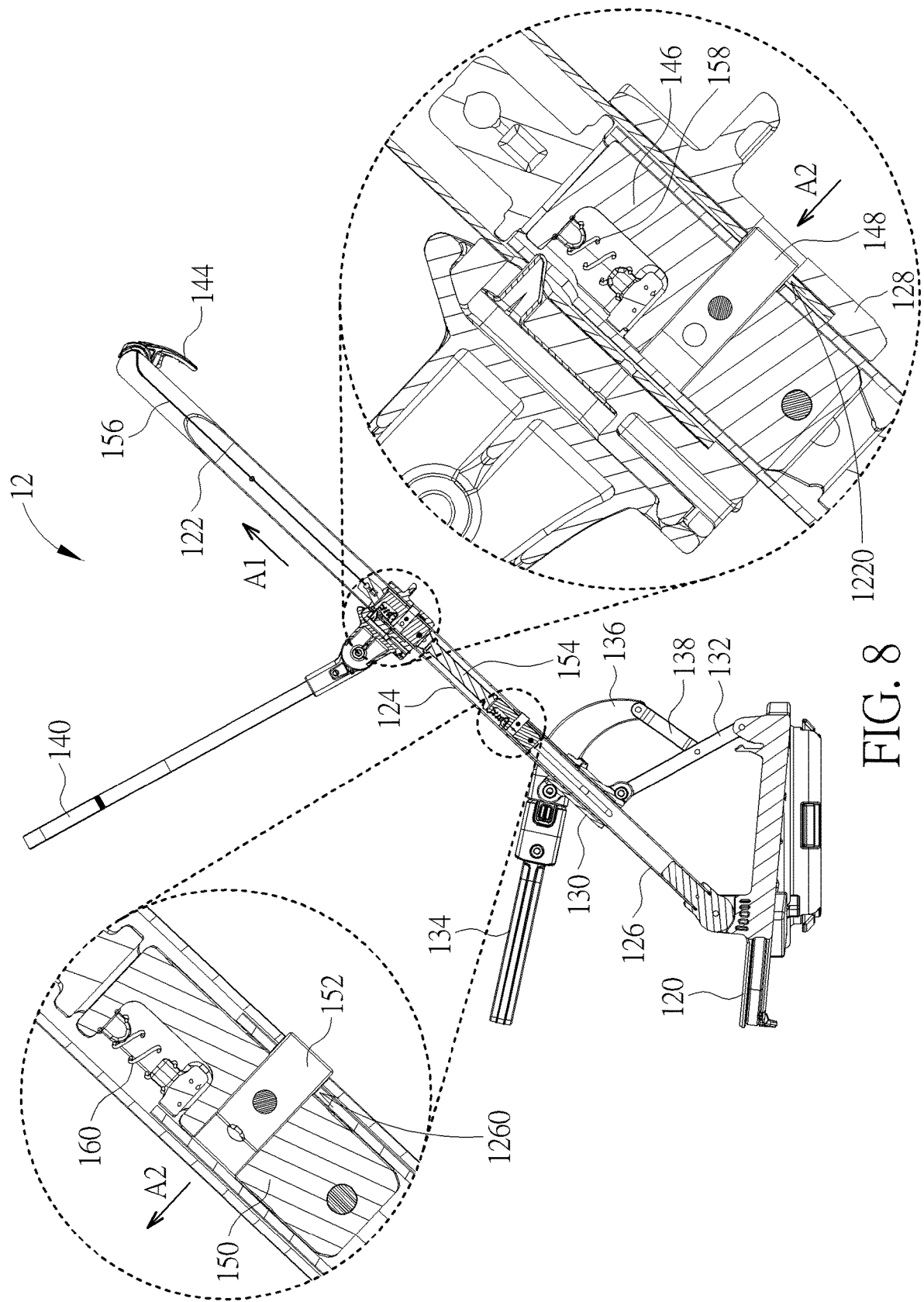
FIG. 8 is a partial sectional view illustrating the seat shown in FIG. 2.
Figure 9:
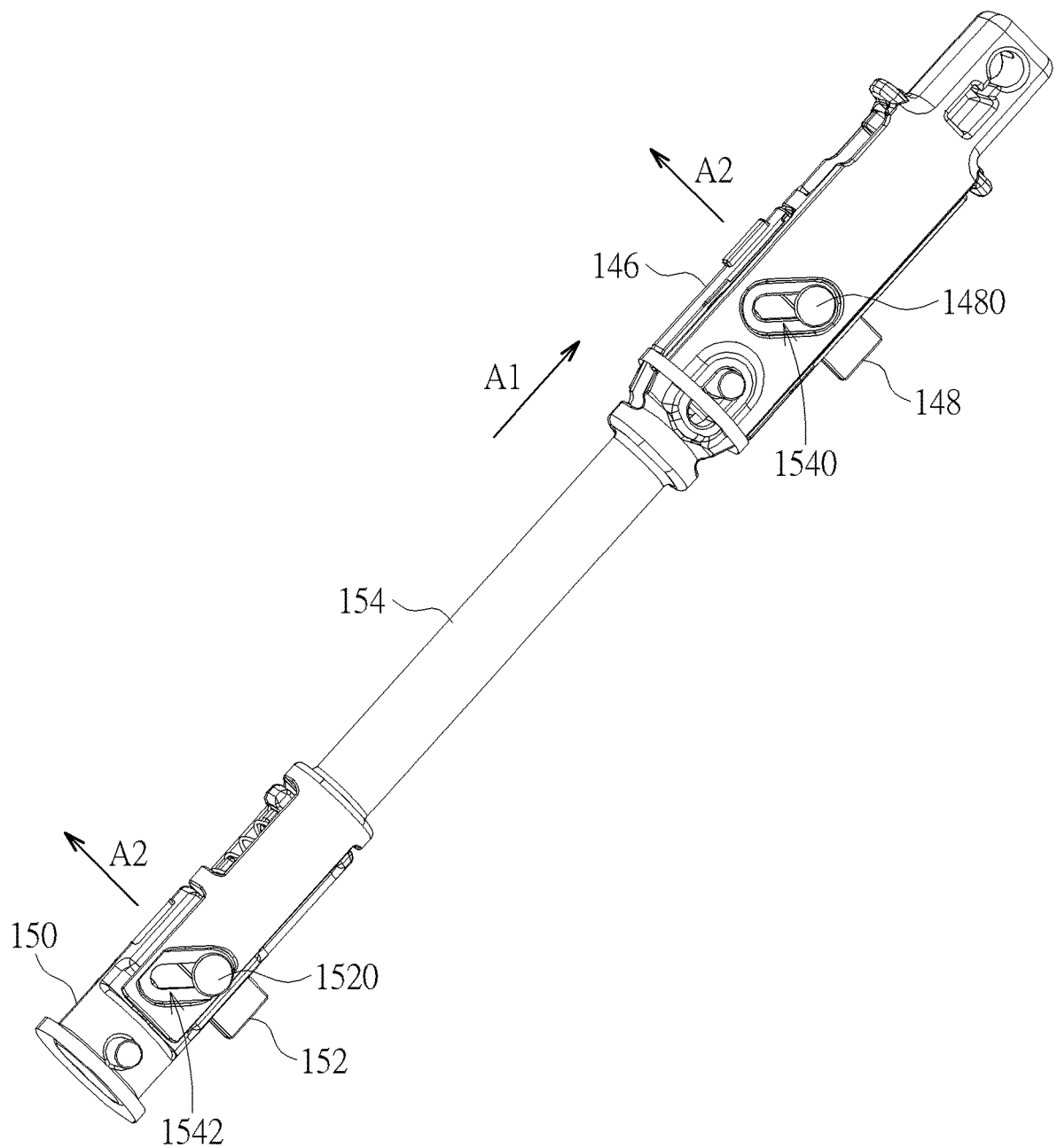
FIG. 9 is a perspective view illustrating an assembly of a first engaging member, a second engaging member and a driving member shown in FIG. 8.

Referring to FIG(S). 8 and 9, FIG. 8 is a partial sectional view illustrating the seat 12 shown in FIG. 2, and FIG. 9 is a perspective view illustrating an assembly of a first engaging member 148, a second engaging member 152 and a driving member 154 shown in FIG. 8.

As shown in FIG. 8, the seat 12 further comprises an operating member 144, a first fixing base 146, a first engaging member 148, a second fixing base 150, a second engaging member 152, a driving member 154, a pulling member 156, a first elastic member 158 and a second elastic member 160. The operating member 144 is disposed on the first backrest support member 122. The first fixing base 146 is disposed in the second backrest support member 124 and close to the first backrest support member 122. The first engaging member 148 is movably disposed on the first fixing base 146. The second fixing base 150 is disposed in the second backrest support member 124 and close to the third backrest support member 126. The second engaging member 152 is movably disposed on the second fixing base 150. The driving member 154 is movably disposed in the second backrest support member 124. The pulling member 156 is connected to the operating member 144 and the driving member 154. In this embodiment, the pulling member 156 may be, but is not limited to, a steel wire. Opposite ends of the first elastic member 158 abut against the first fixing base 146 and the driving member 154. Opposite ends of the second elastic member 160 abut against the second fixing base 150 and the driving member 154. In this embodiment, the first elastic member 158 and the second elastic member 160 may be, but are not limited to, springs.

As shown in FIG. 8, the first backrest support member 122 has a first engaging hole 1220 and the third backrest support member 126 has a second engaging hole 1260. When the first backrest support member 122 is unfolded with respect to the second backrest support member 124, the first engaging member 148 engages with the first engaging hole 1220 to restrain the first backrest support member 122 from sliding with respect to the second backrest support member 124. When the second backrest support member 124 is unfolded with respect to the third backrest support member 126, the second engaging member 152 engages with the second engaging hole 1260 to restrain the second backrest support member 124 from sliding with respect to the third backrest support member 126. A user may operate the operating member 144 to pull the pulling member 156. In this embodiment, the operating member 144 may be a handle pivotally connected to the first backrest support member 122. Thus, the user may press the handle to pull the pulling member 156. When the operating member 144 pulls the pulling member 156, the pulling member 156 pulls the driving member 154 in a direction of an arrow A1. At this time, the driving member 154 drives the first engaging member 148 and the second engaging member 152 to disengage from the first engaging hole 1220 and the second engaging hole 1260, such that the first backrest support member 122, the second backrest support member 124 and the third backrest support member 126 are able to slide with respect to each other to be folded.

As shown in FIG. 9, the first engaging member 148 may have a first driving portion 1480, the second engaging member 152 may have a second driving portion 1520, and the driving member 154 may have a first inclined groove 1540 and a second inclined groove 1542. The first driving portion 1480 of the first engaging member 148 is disposed in the first inclined groove 1540 of the driving member 154, and the second driving portion 1520 of the second engaging member 152 is disposed in the second inclined groove 1542 of the driving member 154. As shown in FIG(S). 8 and 9, when the pulling member 156 pulls the driving member 154 in the direction of the arrow A1, the first inclined groove 1540 pushes the first driving portion 1480 in a direction of an arrow A2 to drive the first engaging member 148 to disengage from the first engaging hole 1220, and the second inclined groove 1542 pushes the second driving portion 1520 in the direction of the arrow A2 to drive the second engaging member 152 to disengage from the second engaging hole 1260. As shown in FIG. 8, when the pulling member 156 pulls the driving member 154 in the direction of the arrow A1, the driving member 154 compresses the first elastic member 158 and the second elastic member 160. When the user releases the operating member 144, the elastic forces generated by the first elastic member 158 and the second elastic member 160 pushes the driving member 154 in a reversed direction of the arrow A1, such that the driving member 154 returns.

Figure 10:
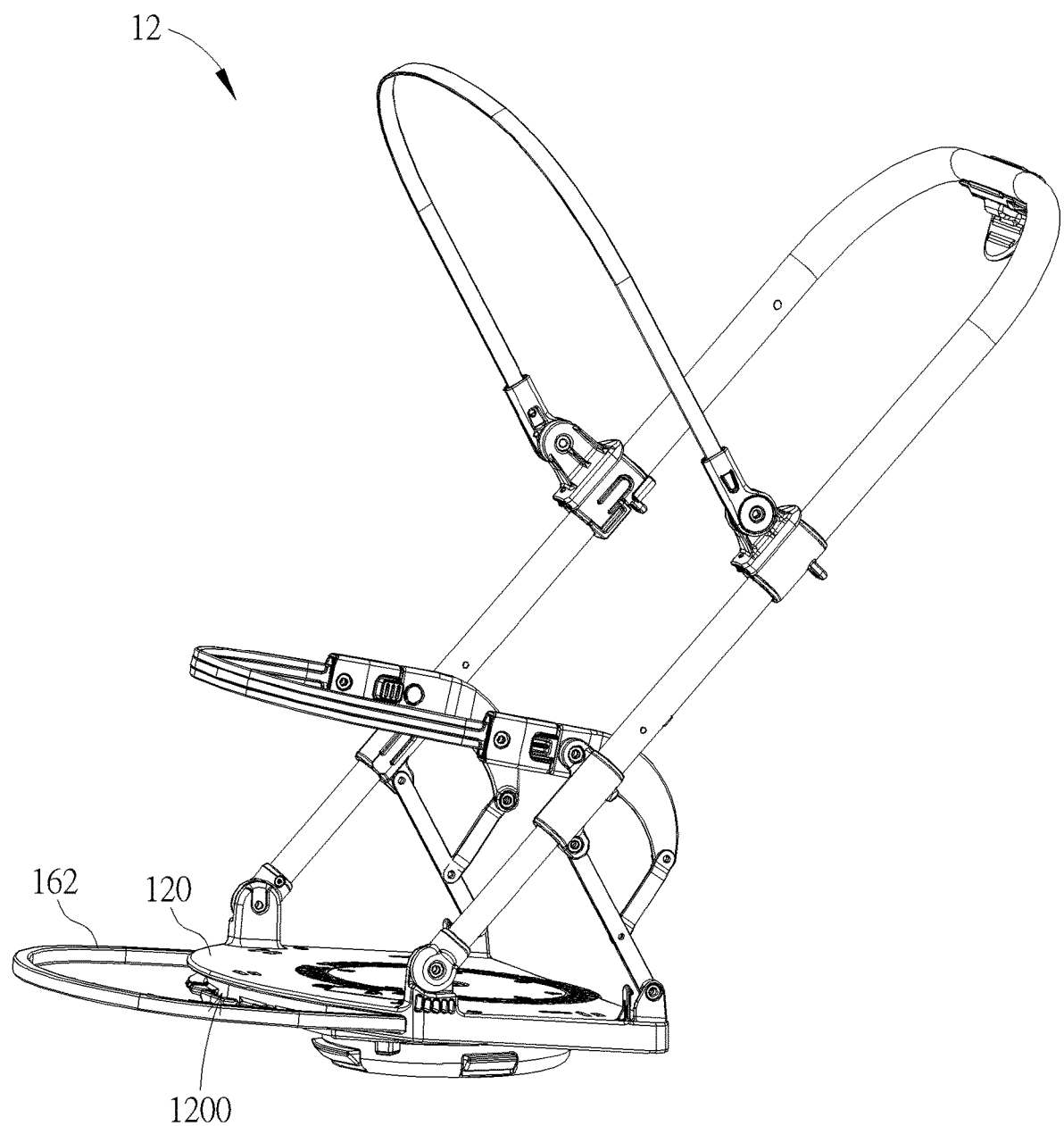
FIG. 10 is a perspective view illustrating a calf rest of the seat shown in FIG. 2 being pulled out.
Figure 11:
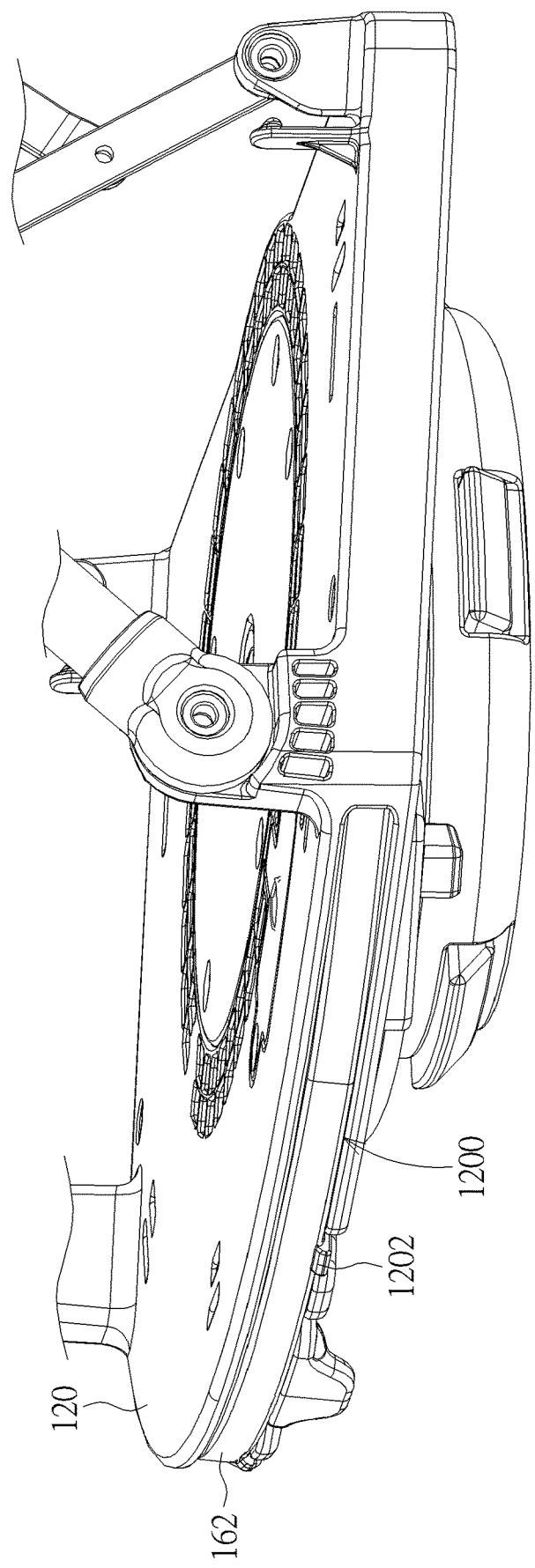
FIG. 11 is a partial enlarged view illustrating the seat shown in FIG. 2.
Figure 12:
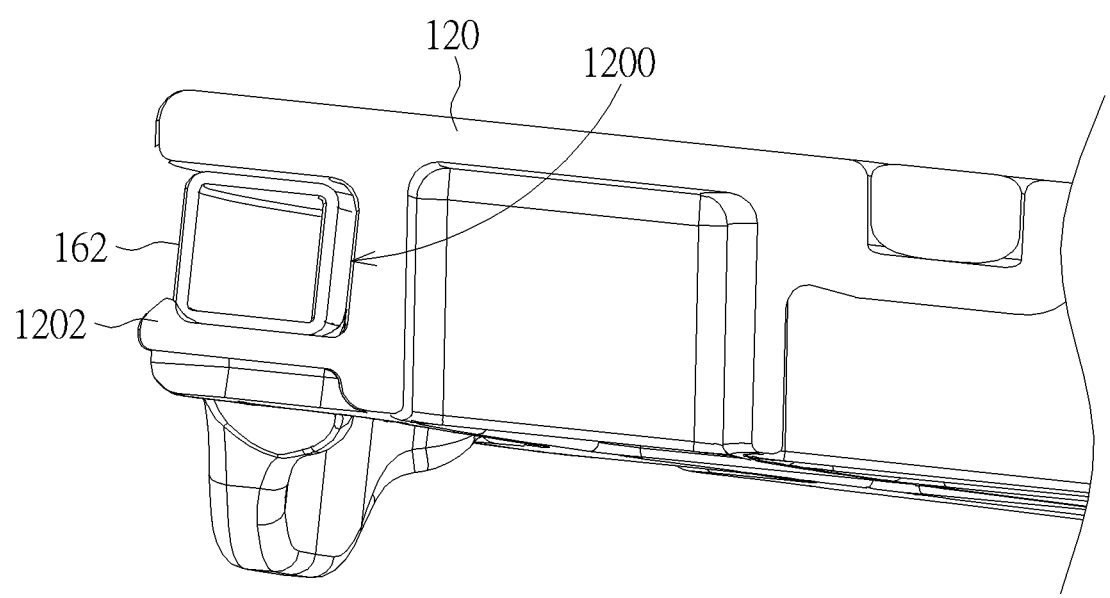
FIG. 12 is a partial sectional view illustrating the seat shown in FIG. 11.

Referring to FIG(S). 10 to 12, FIG. 10 is a perspective view illustrating a calf rest 162 of the seat 12 shown in FIG. 2 being pulled out, FIG. 11 is a partial enlarged view illustrating the seat shown in FIG. 2, and FIG. 12 is a partial sectional view illustrating the seat 12 shown in FIG. 11.

As shown in FIG(S). 10 to 12, the seat 12 may further comprise a calf rest 162 and a front end of the seat plate 120 may have an accommodating recess 1200, wherein the calf rest 162 is movably disposed in the accommodating recess 1200. In this embodiment, a restraining portion 1202 is disposed at an opening of the accommodating recess 1200. As shown in FIG(S). 11 and 12, when the calf rest 162 is completely accommodated in the accommodating recess 1200, the restraining portion 1202 restrains the calf rest 162 from moving, so as to prevent the calf rest 162 from coming off the accommodating recess 1200. Thus, the user may pull the calf rest 162 out of the seat 12 for use or store the calf rest 162 in the accommodating recess 1200 of the seat 12.

As mentioned in the above, the invention achieves three-stage folding by the telescopic arrangement of the first backrest support member, the second backrest support member and the third backrest support member. Accordingly, an overall height of the seat can be effectively reduced after the seat is folded. Furthermore, when the first backrest support member, the second backrest support member and the third backrest support member slide with respect to each other to be folded or unfolded, the second sliding sleeve drives the third backrest support member to be folded or unfolded with respect to the seat plate through the backrest linkage arm, such that the whole seat is folded or unfolded. At the same time, the second sliding sleeve drives the handrail to be folded or unfolded synchronously through the backrest linkage arm and the handrail linkage arm. Moreover, the canopy also slides as the first sliding sleeve slides and a user may rotate the canopy to fold or unfold the canopy. Accordingly, the user can fold or unfold the seat conveniently and rapidly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A seat comprising:
   a seat plate;
   a first backrest support member;
   a second backrest support member telescopically connected to the first backrest support member;
   a third backrest support member telescopically connected to the second backrest support member and pivotally connected to the seat plate;
   a first sliding sleeve disposed on the first backrest support member; and
   a second sliding sleeve disposed on the second backrest support member;
   wherein the first backrest support member, the second backrest support member and the third backrest support member are able to slide with respect to each other to be folded or unfolded, the first sliding sleeve slides as the first backrest support member slides, and the second sliding sleeve slides as the second backrest support member slides.

2. The seat of claim 1, further comprising a backrest linkage arm, the backrest linkage arm being pivotally connected to the seat plate and the second sliding sleeve; when the second backrest support member slides with respect to the third backrest support member, the second sliding sleeve driving the backrest linkage arm to rotate, so as to drive the third backrest support member to rotate with respect to the seat plate.

3. The seat of claim 2, further comprising a handrail, a handrail fixing base and a handrail linkage arm, the handrail being detachably connected to the handrail fixing base, the handrail fixing base being pivotally connected to the second sliding sleeve, the handrail linkage arm being pivotally connected to the handrail fixing base and the backrest linkage arm; when the second sliding sleeve drives the backrest linkage arm to rotate, the backrest linkage arm driving the handrail linkage arm to rotate, so as to drive the handrail fixing base and the handrail thereon to rotate.

4. The seat of claim 1, further comprising a canopy, the canopy being pivotally connected to the first sliding sleeve, the canopy sliding as the first sliding sleeve slides.

5. The seat of claim 1, wherein the first backrest support member has a first engaging hole, the third backrest support member has a second engaging hole, and the seat further comprises:
   an operating member disposed on the first backrest support member;
   a first fixing base disposed in the second backrest support member and close to the first backrest support member;
   a first engaging member movably disposed on the first fixing base, the first engaging member engaging with the first engaging hole;
   a second fixing base disposed in the second backrest support member and close to the third backrest support member;
   a second engaging member movably disposed on the second fixing base, the second engaging member engaging with the second engaging hole;
   a driving member movably disposed in the second backrest support member; and
   a pulling member connected to the operating member and the driving member;
   wherein when the operating member pulls the pulling member, the pulling member pulls the driving member, and the driving member drives the first engaging member and the second engaging member to disengage from the first engaging hole and the second engaging hole, such that the first backrest support member, the second backrest support member and the third backrest support member are able to slide with respect to each other to be folded.

6. The seat of claim 5, wherein the first engaging member has a first driving portion, the second engaging member has a second driving portion, the driving member has a first inclined groove and a second inclined groove, the first driving portion is disposed in the first inclined groove, and the second driving portion is disposed in the second inclined groove; when the pulling member pulls the driving member, the first inclined groove pushes the first driving portion to drive the first engaging member to disengage from the first engaging hole, and the second inclined groove pushes the second driving portion to drive the second engaging member to disengage from the second engaging hole.

7. The seat of claim 5, further comprising a first elastic member and a second elastic member, opposite ends of the first elastic member abutting against the first fixing base and the driving member, opposite ends of the second elastic member abutting against the second fixing base and the driving member.

8. The seat of claim 1, further comprising a calf rest, the seat plate having an accommodating recess, the calf rest being movably disposed in the accommodating recess.

9. The seat of claim 8, wherein a restraining portion is disposed at an opening of the accommodating recess; when the calf rest is completely accommodated in the accommodating recess, the restraining portion restrains the calf rest from moving.

10. A stroller comprising:
    a frame; and
    a seat detachably disposed on the frame, the seat comprising:
       a seat plate;
       a first backrest support member;

a second backrest support member telescopically connected to the first backrest support member;

a third backrest support member telescopically connected to the second backrest support member and pivotally connected to the seat plate;

a first sliding sleeve disposed on the first backrest support member; and a second sliding sleeve disposed on the second backrest support member;

wherein the first backrest support member, the second backrest support member and the third backrest support member are able to slide with respect to each other to be folded or unfolded, the first sliding sleeve slides as the first backrest support member slides, and the second sliding sleeve slides as the second backrest support member slides.

11. The stroller of claim 10, wherein the seat further comprises a backrest linkage arm, the backrest linkage arm is pivotally connected to the seat plate and the second sliding sleeve; when the second backrest support member slides with respect to the third backrest support member, the second sliding sleeve drives the backrest linkage arm to rotate, so as to drive the third backrest support member to rotate with respect to the seat plate.

12. The stroller of claim 11, wherein the seat further comprises a handrail, a handrail fixing base and a handrail linkage arm, the handrail is detachably connected to the handrail fixing base, the handrail fixing base is pivotally connected to the second sliding sleeve, the handrail linkage arm is pivotally connected to the handrail fixing base and the backrest linkage arm; when the second sliding sleeve drives the backrest linkage arm to rotate, the backrest linkage arm drives the handrail linkage arm to rotate, so as to drive the handrail fixing base and the handrail thereon to rotate.

13. The stroller of claim 10, wherein the seat further comprises a canopy, the canopy is pivotally connected to the first sliding sleeve, and the canopy slides as the first sliding sleeve slides.

14. The stroller of claim 10, wherein the first backrest support member has a first engaging hole, the third backrest support member has a second engaging hole, and the seat further comprises:

an operating member disposed on the first backrest support member;

a first fixing base disposed in the second backrest support member and close to the first backrest support member;

a first engaging member movably disposed on the first fixing base, the first engaging member engaging with the first engaging hole;

a second fixing base disposed in the second backrest support member and close to the third backrest support member;

a second engaging member movably disposed on the second fixing base, the second engaging member engaging with the second engaging hole;

a driving member movably disposed in the second backrest support member; and a pulling member connected to the operating member and the driving member;

wherein when the operating member pulls the pulling member, the pulling member pulls the driving member, and the driving member drives the first engaging member and the second engaging member to disengage from the first engaging hole and the second engaging hole, such that the first backrest support member, the second backrest support member and the third backrest support member are able to slide with respect to each other to be folded.

15. The stroller of claim 14, wherein the first engaging member has a first driving portion, the second engaging member has a second driving portion, the driving member has a first inclined groove and a second inclined groove, the first driving portion is disposed in the first inclined groove, and the second driving portion is disposed in the second inclined groove; when the pulling member pulls the driving member, the first inclined groove pushes the first driving portion to drive the first engaging member to disengage from the first engaging hole, and the second inclined groove pushes the second driving portion to drive the second engaging member to disengage from the second engaging hole.

16. The stroller of claim 14, wherein the seat further comprises a first elastic member and a second elastic member, opposite ends of the first elastic member abut against the first fixing base and the driving member, and opposite ends of the second elastic member abut against the second fixing base and the driving member.

17. The stroller of claim 10, wherein the seat further comprises a calf rest, the seat plate has an accommodating recess, and the calf rest is movably disposed in the accommodating recess.

18. The stroller of claim 17, wherein a restraining portion is disposed at an opening of the accommodating recess; when the calf rest is completely accommodated in the accommodating recess, the restraining portion restrains the calf rest from moving.

* * * * *